US012788543B2

(12) United States Patent
Stange et al.

(10) Patent No.: US 12,788,543 B2
(45) Date of Patent: Nov. 10, 2026

(54) METHOD FOR PRODUCING STRUCTURED LAYERS FOR MATERIALS FOR PRODUCING DENTAL PROSTHESES, AND DEVICE FOR THIS PURPOSE

(71) Applicant: Kulzer GmbH, Hanau (DE)

(72) Inventors: Frank-Uwe Stange, Langenargen (DE); Matthias Moeller, Eriskirch (DE); Stefan Payer, Ehingen (DE); Chai Johnson, Shanghai (CN)

(73) Assignee: Kulzer GmbH, Hanau (DE)

( * ) Notice: Subject to any disclaimer, the term of this patent is extended or adjusted under 35 U.S.C. 154(b) by 368 days.

(21) Appl. No.: 18/280,764

(22) PCT Filed: Mar. 1, 2022

(86) PCT No.: PCT/EP2022/055138
§ 371 (c)(1),
(2) Date: Sep. 7, 2023

(87) PCT Pub. No.: WO2022/194540
PCT Pub. Date: Sep. 22, 2022

(65) Prior Publication Data

US 2024/0173109 A1 May 30, 2024

(30) Foreign Application Priority Data

Mar. 19, 2021 (DE) ............................ 102021106798

(51) Int. Cl.
*A21C 13/00* (2006.01)
*A61C 13/00* (2006.01)
(Continued)

(52) U.S. Cl.
CPC ........ *A61C 13/0021* (2013.01); *A61C 13/082* (2013.01); *B32B 3/02* (2013.01);
(Continued)

(58) Field of Classification Search
CPC .............. A61C 13/0021; A61C 13/082; B29C 2043/147
See application file for complete search history.

(56) References Cited

U.S. PATENT DOCUMENTS

| | | | | |
|---|---|---|---|---|
| 4,970,032 A | | 11/1990 | Rotsaert | |
| 5,902,839 A | * | 5/1999 | Lautenschlager .. | A61K 49/0409 524/358 |

(Continued)

FOREIGN PATENT DOCUMENTS

| | | | |
|---|---|---|---|
| DE | 102011055393 B4 | | 3/2016 |
| DE | 102017116630 A1 | | 1/2019 |

(Continued)

OTHER PUBLICATIONS

Search Report in International Application No. PCT/EP2022/055138 dated Jun. 22, 2022, 7 pages.

(Continued)

*Primary Examiner* — Alison L Hindenlang
*Assistant Examiner* — Alexander A Wang
(74) *Attorney, Agent, or Firm* — MARSHALL, GERSTEIN & BORUN LLP

(57) ABSTRACT

The invention relates to a method for producing a plastics body with patterned layers for producing dental prostheses having the steps:

method for production, wherein the method is characterized by the following steps:

A) providing a first and a second PMMA-based compound which are uncured and have different colorations;

B) heating of a first patterned pressing surface to between 90° C. and 150° C.;

(Continued)

C) pressing of the first PMMA-based compound with the heated first pressing surface, such that a patterned surface of the first PMMA-based compound is obtained;
D) detachment of the first pressing surface;
E) heating of the first or of a second patterned pressing surface to between 90° C. and 150° C.;
F) pressing of the second PMMA-based compound with the heated pressing surface, such that a patterned surface of the second PMMA-based compound is obtained;
G) detachment of the pressing surface;
H) subsequent laying of the patterned first and second PMMA-based compounds on one another such that the patterned surface of the second PMMA-based compound is oriented toward the patterned surface of the first PMMA-based compound; and
I) compression molding of the first with the second patterned PMMA-based compound, such that a solid bond is created between the first PMMA-based compound and the second PMMA-based compound.

The invention also relates to a device for implementing such a method.

23 Claims, 10 Drawing Sheets

(51) Int. Cl.

| | |
|---|---|
| ***A61C 13/08*** | (2006.01) |
| ***B32B 3/02*** | (2006.01) |
| ***B32B 27/08*** | (2006.01) |
| ***B32B 27/30*** | (2006.01) |

(52) U.S. Cl.
CPC ............ *B32B 27/08* (2013.01); *B32B 27/308* (2013.01); *B32B 2250/24* (2013.01); *B32B 2307/404* (2013.01); *B32B 2535/00* (2013.01)

(56) References Cited

U.S. PATENT DOCUMENTS

| | | | | |
|---|---|---|---|---|
| 5,989,031 | A | 11/1999 | Kura et al. | |
| 11,517,407 | B2 | 12/2022 | Hagenbuch et al. | |
| 2008/0093764 | A1* | 4/2008 | Ito | B29C 48/255 425/429 |
| 2012/0175801 | A1* | 7/2012 | Jahns | A61C 13/081 425/130 |
| 2013/0249132 | A1* | 9/2013 | Thompson | A61C 13/0022 264/17 |
| 2014/0106308 | A1* | 4/2014 | Thiel | A61C 13/081 433/203.1 |
| 2016/0220337 | A1 | 8/2016 | Steger | |
| 2020/0317561 | A1 | 10/2020 | Arnold et al. | |
| 2020/0345466 | A1 | 11/2020 | Ruppert | |
| 2021/0196437 | A1 | 7/2021 | Seger et al. | |

FOREIGN PATENT DOCUMENTS

| | | | |
|---|---|---|---|
| DE | 102017122993 | B4 | 3/2021 |
| EP | 3669818 | A1 | 6/2020 |
| WO | WO-2013/072287 | A1 | 5/2013 |
| WO | WO-2020/025795 | A1 | 2/2020 |

OTHER PUBLICATIONS

Office Action in DE Application No. 10 2021 106 798.7 dated Oct. 1, 2021, 11 pages.

* cited by examiner

METHOD FOR PRODUCING STRUCTURED LAYERS FOR MATERIALS FOR PRODUCING DENTAL PROSTHESES, AND DEVICE FOR THIS PURPOSE

BACKGROUND OF THE INVENTION

Field of the Invention

Related Technology

The invention relates to a method for producing patterned layers in materials for dental prosthesis production. The invention further relates to a device for implementing such a method.

The method is suitable for permanently patterning pasty surfaces of reactive mixtures, in particular acrylates and methacrylates, and patterned surfaces produced therefrom between the layers. In this way, natural-looking color transitions can be created in a plastics body which is used for producing dental prostheses, such that the appearance of the dental prostheses is as natural as possible.

A dental prosthesis should be taken to mean prosthetic teeth for dentures (full or partial dentures) as well as crowns and bridges which are intended to replicate or replace a natural tooth.

Multilayer discs of material are required for producing natural-looking dental prostheses from plastics or ceramics by way of subtractive fabrication methods. The transitions between the individual layers should not be sharply defined but should have a diffuse pattern at the boundary surfaces so that they better match the natural appearance of natural teeth.

U.S. Pat. Nos. 4,970,032 A and 5,989,031 A disclose multicolored blanks for producing dental prostheses, such as crowns. The layers are here laid on one another to give the dental prosthesis a natural appearance and to approximate a natural tooth in terms of stability and wear of the material. Injection molding is mentioned as one example of a production method. However, this can result in undesirable and unnatural-looking sharp boundary surfaces.

WO 2020/025795 A1 and US 2020/0317561 A1 disclose methods for producing a ceramic blank with color transitions from which dental prostheses can be fabricated. Fabricating such ceramics and vitreous ceramics is very costly, as is their processing. Production from plastics is therefore frequently preferred.

DE 10 2017 116 630 A1 discloses a method for producing a partially sintered multilayer ceramic blank with color transitions for producing natural-looking color transitions. In the method, the green discs must be separately partially compacted before the green compacts of the ceramic discs to be bonded to one another are bonded. DE 10 2011 055 393 B4 discloses a multilayer plastics blank for producing dental prostheses, in which a liquid plastics layer is applied to a profiled surface. The layers are produced in that case using an elaborate multicomponent injection molding method, the plastics layers being applied directly in liquid form. The method has the disadvantage that the patterning of the surface is lost or at least partially lost upon application of the plastics layer because the liquid plastics layer breaks down or dissolves the patterns. DE 10 2017 122 993 B4 discloses a method for producing a monochromatic polymerizable dental composite material, in which parts of a multi-part mold are heatable for hot isostatic pressing. The method is intended to prevent cracking in the monochromatic milling blocks. Color transitions or the assembly of milling blocks are not addressed and would also be a hindrance to the aims of DE 10 2017 122 993 B4, namely the production of milling blocks which are as homogeneous as possible.

WO 2013/072287 A1 discloses a blank for artificial teeth with a plurality of different colored layers, in which two plastics layers are introduced into cavities of an injection mold. By injecting the second plastics layer into the same injection mold onto the as yet unsolidified first plastics layer, the intention is for the two plastics layers to be bonded to one another in such a way as to promote a homogeneous color transition. The disadvantage of this method is that mixing nevertheless occurs along a planar boundary surface, whereby the dental prostheses fabricated from such a blank will have a straight line pattern which is detrimental to a natural appearance of the prosthetic teeth. In addition, the miscibility of the plastics is usually poor or largely impossible if highly crosslinked or adhesive PMMA-based compounds are used, such that separation lines which are unwanted because they look unnatural then occur. Because of the way it is technically implemented, the described method is also exclusively limited to thermoplastics. This results in distinctly limited material properties with regard to function and resistance to polymerizable, crosslinking reactive systems.

EP 3 669 818 A1 discloses a multicolored dental milling blank which can be plastics-based. The multicolored milling blank has a plurality of layers with round surfaces in a boundary surface between the layers which is denoted transition geometry. The layers can be joined together by being laid on one another, adhesively bonded or melted. The disadvantage here is that joining the layers is complex and there is a risk with plastics that the patterns will be deformed when the second layer is poured. In addition, the boundary surface should as far as possible not be able to form any predetermined breaking points, such that it would be better for crosslinking not to be complete when joining plastics. However this has a negative impact on dimensional stability.

When unpolymerized disc-shaped bodies are stacked on one another, a more or less pronounced sharp phase boundary is obtained depending on the coloring of the individual layers. This results in a striped pattern in the dental work subsequently fabricated from the polymerized plastics body (blank). According to the prior art, a clearly defined geometry may also be achieved by curing a first layer before the second layer is applied as a soft paste. The phase boundary is thus clearly defined in shape.

In principle, the following possibilities are available for the production of multilayer moldings:

1. layering of pasty discs of material on one another and subsequent polymerization, wherein this results in sharply defined, unnatural-looking phase boundaries;
2. production directly from the still liquid phase by layering still pourable mixtures (this is only feasible with methyl methacrylate-systems), wherein this results in diffuse transitions and thus in a visually satisfactory result, wherein it is, however, problematic here that the liquid mixtures cannot be stored and therefore just-in-time fabrication of all stages is necessary and pot life is also limited, which makes the process difficult to implement on a large scale;
3. fabrication of polymerized individual layers on a patterned surface and subsequent combination with as yet unpolymerized paste similarly to EP 3 669 818 A1, wherein a pattern is obtained which suffers the disadvantages that the phase boundary exactly matches the geometric pattern of the impressed pattern, that only lightly patterned and rounded areas can be impressed, since otherwise retentive adhesion of the polymerized material occurs, that the transitions are sharply defined and visibility is dependent on the quality of the coloring, and that the method proceeds in multiple stages and is thus more costly; and 4. production from many only very slightly contrasting layers, wherein this method yields good results, but costs are very high due to the large number of layers to be produced in advance and the layers have to be made very thin.

SUMMARY

The object of the invention is to overcome the disadvantages of the prior art. In particular, the intention is to find a way of providing a method and a device with which a plastics body can be produced in an inexpensive and straightforward manner which has a natural appearance with regard to natural color transitions of teeth, wherein natural-looking dental prostheses can accordingly be milled or machined from the plastics body.

The objects of the invention are achieved by a method according to claim 1 and a device according to claim 15. Preferred variants are claimed by subclaims 2 to 14, and 16 and 17.

The objects of the invention are thus achieved by a method for producing a plastics body with patterned layers for producing dental prostheses, wherein the method is characterized by the following steps:

A) Providing a first PMMA-based compound and a second PMMA-based compound, wherein the first PMMA-based compound is uncured and has a first coloration and wherein the second PMMA-based compound is uncured and has a second coloration, wherein the second coloration of the second PMMA-based compound differs from the first coloration of the first PMMA-based compound;

B) Heating of a first patterned pressing surface to a temperature of between 90° C. and 150° C.;

C) Pressing of the first PMMA-based compound with the heated first patterned pressing surface, wherein a patterned surface of the first PMMA-based compound is obtained in this manner;

D) subsequent detachment of the first pressing surface from the patterned first PMMA-based compound, wherein the patterned surface of the first PMMA-based compound is retained; and E) Heating of the first patterned pressing surface to a temperature of between 90° C. and 150° C. or heating of a second patterned pressing surface to a temperature of between 90° C. and 150° C.;

F) Pressing of the second PMMA-based compound with the heated first patterned pressing surface or the heated second patterned pressing surface, wherein a patterned surface of the second PMMA-based compound is obtained in this manner;

G) subsequent detachment of the first pressing surface or the second pressing surface from the patterned second PMMA-based compound, wherein the patterned surface of the second PMMA-based compound is retained;

H) subsequent laying of the patterned second PMMA-based compound on the patterned first PMMA-based compound, such that the patterned surface of the second PMMA-based compound is oriented toward the patterned surface of the first PMMA-based compound; and I) subsequent compression molding of the first patterned PMMA-based compound with the second patterned PMMA-based compound, such that a solid bond is created between the first PMMA-based compound and the second PMMA-based compound.

A PMMA-based compound should be taken to mean an incompletely crosslinked and fluid and moldable plastics material of polymethyl methacrylate (PMMA). The PMMA-based compound consists of 50 to 90 wt. % pulverulent polymers, such as PMMA, preferably 60 to 70 wt. % PMMA, in particular PMMA bead polymers, and 10 to 50 wt. % monomers, preferably 30 to 40 wt. % monomers, wherein the monomers in particular comprise (meth)acrylates, derivatives of (meth)acrylates and/or crosslinking agents, such as di- and polyfunctional (meth)acrylates.

The PMMA-based compound should preferably be plastically deformable with a pressure of 10 $kN/m^2$ or more.

For the purposes of the present invention, a patterned surface should be taken to mean a surface with a macroscopic pattern. Patterns of between 1 mm and 3 mm may preferably be provided.

If the plastics body is to be suitable for producing dental prostheses, it must consist of a biocompatible material. Once cured, the plastics body should have sufficient hardness for use in the masticatory region of a jaw. Provision may for this purpose be made for the fully cured plastics body to have a Vickers hardness of at least 100 HV10 to DIN EN ISO 6507-1:2018 to -4:2018.

The PMMA-based compounds used for the purposes of the present invention are preferably highly crosslinking PMMA-based compounds. Elevated strength of the plastics body and thus of the dental prostheses fabricated from the plastics body can consequently be achieved. The dental prostheses are consequently also suitable for replacing masticatory surfaces.

The sequence of steps B) to D) and the sequence of steps E) to G) may also be carried out simultaneously or in parallel.

Provision may be made for a step J) of curing the patterned first PMMA-based compound and the second PMMA-based compound compression molded therewith, wherein step J) preferably proceeds after step I).

This makes the plastics body ready for further processing of dental prostheses.

Provision may moreover be made for pressing of an uncured third PMMA-based compound to proceed with two heated patterned pressing surfaces arranged opposite one another, wherein a patterned surface is consequently obtained on both sides of the third PMMA-based compound, wherein the third PMMA-based compound has a third coloration which differs from the first coloration of the first PMMA-based compound and from the second coloration of the second PMMA-based compound, subsequent detachment of the pressing surfaces from the third PMMA-based compound patterned on both sides, wherein the two patterned surfaces of the third PMMA-based compound are retained, wherein in step H) the patterned third PMMA-based compound is arranged between the patterned second PMMA-based compound and the patterned first PMMA-based compound, such that the patterned surfaces lie against one another, and wherein in step I) subsequent compression molding of the first patterned PMMA-based compound with the second patterned PMMA-based compound and with the third patterned PMMA-based compound arranged therebetween proceeds such that a solid bond is created between the first PMMA-based compound, the second PMMA-based compound and the third PMMA-based compound.

This creates a multistage, natural-looking transition in the plastics body which can straightforwardly be produced using the method.

Provision may alternatively be made in step H) for overall a plurality of further PMMA-based compounds to be arranged between the first patterned PMMA-based compound and the patterned second PMMA-based compound, wherein the colorations of adjacent PMMA-based compounds of the first, second and plurality of PMMA-based compounds preferably differ from one another, wherein before step H) each of the plurality of further PMMA-based compounds is patterned with two heated patterned pressing surfaces arranged opposite one another, wherein a patterned surface is consequently obtained on both sides of the plurality of further PMMA-based compounds, and the pressing surfaces are subsequently detached from the plurality of further PMMA-based compounds patterned on both sides, wherein the two patterned surfaces of the plurality of further PMMA-based compounds are retained, and in step I) for subsequent compression molding of the first patterned PMMA-based compound with the second patterned PMMA-based compound and with the plurality of further patterned PMMA-based compounds arranged therebetween to proceed such that a solid bond is created between the first PMMA-based compound, the second PMMA-based compound and the plurality of further patterned PMMA-based compounds arranged therebetween.

A separate pressing surface can be used for each of the patterned surfaces of all the PMMA-based compounds or a limited number of pressing surfaces can be used repeatedly, in succession or permutatively. Different pressing surfaces are preferably always used for adjacent PMMA-based compounds or layers produced therefrom. For this purpose, it is sufficient to always use the first pressing surface and the second pressing surface alternately.

This creates a multistage, natural-looking transition in the plastics body which can straightforwardly be produced using the method.

Provision may preferably be made for the plurality of further PMMA-based compounds to number between two and twenty further PMMA-based compounds, particularly preferably between two and ten further PMMA-based compounds.

Provision may also be made for pressing of the first PMMA-based compound in step C) with the heated first patterned pressing surface and pressing of the second PMMA-based compound in step F) with the first patterned pressing surface or with the second heated patterned pressing surface to proceed with a pressure of between 10 $kN/m^2$ and 500 $kN/m^2$, preferably with a pressure of between 10 $kN/m^2$ and 100 $kN/m^2$, particularly preferably with a pressure of between 10 $kN/m^2$ and 50 $kN/m^2$.

This can ensure that the first fluid PMMA-based compound and the second fluid PMMA-based compound are shapeable in a consistency suitable for processing and the surfaces thereof are patternable in the desired manner, such that the desired transitions are straightforwardly obtained.

Provision may also be made for pressing of the third PMMA-based compound or of the further PMMA-based compounds with the two heated patterned pressing surfaces arranged opposite one another to proceed with a pressure of between 10 $kN/m^2$ and 500 $kN/m^2$, preferably with a pressure of between 10 $kN/m^2$ and 100 $kN/m^2$, particularly preferably with a pressure of between 10 $kN/m^2$ and 50 $kN/m^2$.

This can ensure that each of the fluid PMMA-based compounds used is shapeable in a consistency suitable for processing and the surfaces thereof are patternable in desired manner, such that the desired transitions are straightforwardly obtained.

According to a preferred further development, provision may be made for pressing of the first PMMA-based compound in step C) with the heated first patterned pressing surface and pressing of the second PMMA-based compound in step G) with the heated first patterned pressing surface or with the heated second patterned pressing surface to proceed for a period of between 1 s and 50 s, preferably for a period of between 5 s and 30 s, wherein preferably and if present, pressing of the third PMMA-based compound or of the plurality of further PMMA-based compounds with the two heated patterned pressing surfaces arranged opposite one another proceeds for a period of between 1 s and 50 s, preferably for a period of between 5 s and 30 s.

This can ensure that the surface patterning of the PMMA-based compounds in each case shaped with the respective pressing surface(s) is also retained once the PMMA-based compounds have been bonded to one another and a natural-looking transition between the layers of the PMMA-based compounds is obtained.

Provision may also be made for the first patterned pressing surface and/or the second patterned pressing surface to be heated during pressing, preferably for all the patterned pressing surfaces used to be heated during pressing.

Preferably and if used, the two patterned pressing surfaces arranged opposite one another are thus also heated during pressing.

This can prevent cooling of the patterned pressing surface (s) during shaping of the surface of the respectively processed PMMA-based compound.

Provision may moreover be made for the first patterned pressing surface and/or the second patterned pressing surface, preferably all the patterned pressing surfaces used, to have patterns with a profile height of between 1 mm and 5 mm, preferably with a profile height of between 2 mm and 3 mm.

Preferably and if used, the two patterned pressing surfaces arranged opposite one another thus also have patterns with a profile height of between 1 mm and 5 mm, preferably with a profile height of between 2 mm and 3 mm.

Patterns with this profile height enable blurring of the boundary surface, which results in a particularly natural-looking transition in the colorations with regard to color transitions in teeth.

Provision may further be made for a pressure of between 10 $kN/m^2$ and 500 $kN/m^2$, preferably of between 10 $kN/m^2$ and 50 $kN/m^2$ to be applied for compression molding in step I).

This strongly joins the PMMA-based layers to one another and entrapped gas can be expelled from the material.

Provision may moreover preferably be made for the first patterned pressing surface and/or the second patterned pressing surface, preferably all the patterned pressing surfaces used, to have a honeycomb pattern or a plurality of peaks projecting from the pressing surface or a plurality of pyramidal or conical protrusions projecting from the pressing surface, wherein the projecting peaks or the projecting pyramidal or conical protrusions are preferably arranged periodically in the pressing surface.

Preferably and if used, both of the patterned pressing surfaces arranged opposite one another thus also have a plurality of peaks projecting from the pressing surface or a plurality of pyramidal or conical protrusions projecting from the pressing surface.

This allows the first patterned pressing surface or the patterned pressing surfaces to be fabricated in a straightforward and inexpensive manner and the color transitions in the layers produced from the PMMA-based compounds are uniformly diffuse throughout the boundary surface and thus natural in appearance.

Provision may also be made for the first patterned pressing surface and/or the second patterned pressing surface, preferably all the patterned pressing surfaces used, to consist of silicone or to be coated with silicone or to consist of a metal, in particular of a stainless steel, wherein the metal is preferably coated, particularly preferably coated with Teflon (polytetrafluoroethylene) or silicone.

Preferably and if used, both the patterned pressing surfaces arranged opposite one another thus also consist of silicone or of a metal, optionally with a coating.

These materials can readily be shaped into patterned pressing surfaces. Metals have elevated thermal conductivity and silicone has low adhesion to the fluid PMMA-based compounds.

Provision may moreover be made for the PMMA-based compounds to have a viscosity of between 1 Pa·s and 1000 Pa·s at their time of use and at a temperature of 20° C.

Viscosity can here be determined with a viscometer to EN ISO 3219.

This viscosity results in suitable dimensional stability of the patterned surfaces of the PMMA-based compounds. This prevents the pattern of the surface from dissolving upon detachment of the pressing surfaces and the transition of coloration thereby becoming a planar boundary surface.

The objects underlying the present invention are also achieved by a method for the production of dental prostheses, wherein the method comprises a previously described method and the method is additionally characterized by the following step:

K) carving out of a dental prosthesis or a plurality of individual dental prostheses from the completely cured plastics body after method steps A) to I) and optionally J), wherein a tooth axis of the dental prosthesis or tooth axes of the plurality of individual dental prostheses extends or extend from a basal end of the dental prosthesis or dental prostheses, wherein the dental prosthesis or the dental prostheses are subtractively carved out from the plastics body in such a manner that the tooth axis or the tooth axes extends or extend through a plurality of layers of the PMMA-based compounds of the plastics body and wherein carving out preferably proceeds with the assistance of a subtractive CAM process.

This further perfects the method and dental prostheses with a natural appearance are obtained as the result of the method.

The objects underlying the present invention are also achieved by a device for implementing such a method, the device comprising at least one patterned pressing surface and a base plate, wherein the at least one patterned pressing surface is heatable, and/or at least two patterned pressing surfaces arranged opposite one another, which are heatable, at least two containers containing at least two differently colored fluid PMMA-based compounds or at least two containers containing the starting components for producing at least two differently colored fluid PMMA-based compounds, and a press for compression molding together at least two patterned PMMA-based compounds stacked on one another.

The device is directly suitable for producing the patterned PMMA-based compounds for producing a layered plastics body as a milling blank for dental prostheses.

The varying coloration of the fluid PMMA-based compounds can be achieved by different colorants (such as for example different coloring pigments) but also by different concentrations of the same colorant. The starting components for producing the at least two differently colored fluid PMMA-based compounds may for example be a cement powder and a monomer liquid for producing a fluid PMMA cement and at least one liquid or pulverulent colorant for coloring the fluid PMMA cement. The PMMA-based compounds are then produced by mixing the cement powder with the monomer liquid and one of the colorants, wherein the colorant for differently colored PMMA-based compounds can be added in different concentrations or different colorants can be added.

Provision may here be made for the device to have a circumferential boundary wall which is arranged on the base plate and in which the at least one patterned pressing surface is movable or which is arranged around the at least two patterned pressing surfaces arranged opposite one another.

This can prevent the PMMA-based compounds from leaking out sideways in an uncontrolled manner, and a compact design of the device can be achieved.

Provision may moreover be made for the device to additionally have at least one filling means for applying the fluid PMMA-based compounds onto the base plate or between the two patterned pressing surfaces arranged opposite one another, wherein the at least one filling means is suitable and provided for filling the PMMA-based compounds within the circumferential boundary (if present).

This enables standardized filling of the device with fluid PMMA-based compounds, thus ensuring a consistent quality for the layered plastics body.

The invention is based on the surprising recognition that heated patterned pressing surfaces can be successfully used to produce at least temporarily durable patterns in fluid PMMA-based compounds which, when bonded to a further patterned PMMA-based compound, produce a diffuse and thus natural-looking transition of different colorations of the PMMA-based compounds. Compression molding of such prepatterned PMMA-based compounds means that the sufficiently stable surface patterns are pushed into one another and also do not completely dissolve again, such that a natural-looking boundary profile is maintained in the plastics body produced in this manner.

Methods according to the invention permit durable prepatterning of pasty surfaces without adhesion of material of the PMMA-based compounds on the patterned pressing surfaces. In contrast with other methods, this also makes it possible, for the first time, to achieve stronger patterning and to enlarge the phase boundary zone in PMMA-based compounds. These features particularly distinguish the products produced according to this method.

Depending on the nature of the textures and how they are executed, very diffuse phase boundaries can be produced but so too can sharply defined transitions if required. The method according to the invention ensures slight solidification of the treated surfaces, which has an additional positive impact on any segregation phenomena at the phase boundaries.

It has been found in the context of the present patent application that patterning the pasty surfaces of methacrylates such as PMMA is not possible using normal mechanical tools, for example by impressing with patterned metal surfaces, due to the elevated tackiness of the materials.

The viscoelastic behavior of PMMA-based compounds also results in a considerable recovery effect, such that the pattern produced in the surface disappears or is at least significantly diminished.

By laying the patterned second PMMA-based compound onto the patterned first PMMA-based compound or by placement of the third PMMA-based compound or the further PMMA-based compounds, such that the patterned surfaces of adjacent PMMA-based compounds are oriented toward one another, it is optionally possible according to step H) to influence the intercalation of adjacent PMMA-based compounds by defined orientation of the surfaces toward one another. The precise positioning of the PMMA-based compounds in relation to each other is usually random, which is desirable for the purpose of a natural appearance. The pattern can be between extensive flattening to direct intercalation while retaining the impression geometries.

According to the invention, production involves the use of pressing surfaces with a distinct, even sharp-edged pattern, such as for example and preferably pyramidal protrusions with a height of 2 mm to 3 mm similar to mechanical files. By heating of the patterned pressing surfaces to temperatures of between 90° C. and 150° C., preferably of between 100 to 140° C., prior to pressing, it is possible to achieve dimensional stability of the freshly patterned surfaces. The pasty materials are preferably impressed on the surfaces for approximately 5 s to 30 s under a defined pressure of between 10 and 500 kN/m$^2$.

BRIEF DESCRIPTION OF THE DRAWINGS

Exemplary embodiments of the invention are explained below with reference to nine schematic figures and one flow chart but without thereby limiting the invention. In the figures:

FIG. 1 shows the sequence of a method according to the invention with a device according to the invention as five partially cross-sectional schematic views arranged above one another of the device according to the invention for implementing a method according to the invention.

DETAILED DESCRIPTION

Figure 1:
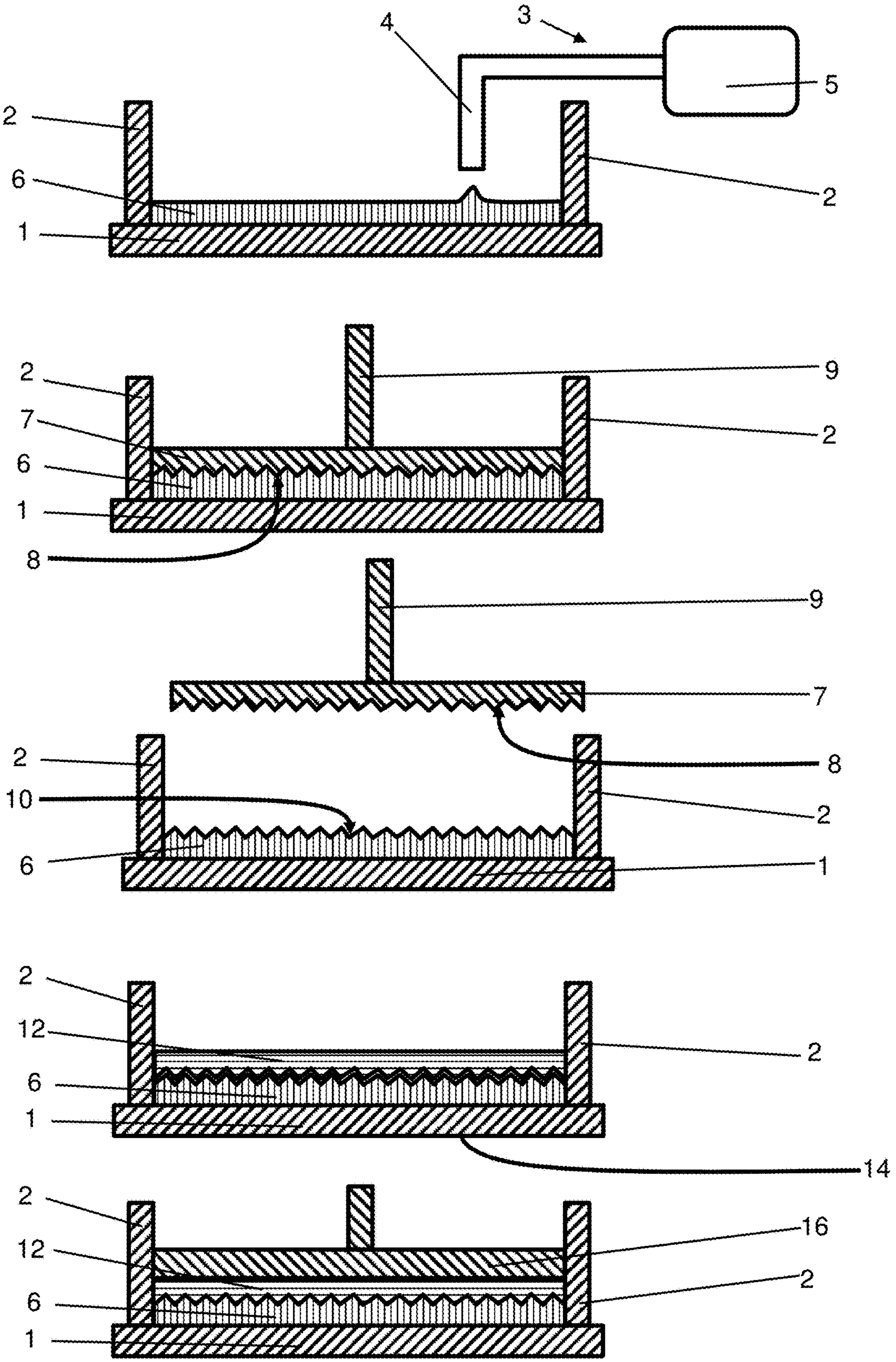
FIG. 1: shows the sequence of a method according to the invention with a device according to the invention as five partially sectional schematic views arranged above one another of the device according to the invention for implementing a method according to the invention.

The device may have a base plate 1 and a boundary wall 2, wherein the boundary wall 2 may rest on the base plate 1 as a ring in the manner of a springform mold or can be fastened to the base plate 1. The device may furthermore have a filling means 3. The filling means 3 may have a pipe 4 and a container 5. A first fluid PMMA-based compound 6 can be applied to the base plate 1 in a defined amount using the filling means 3. The filling means 3 may for this purpose for example take the form of a dispensing device in the manner of a soap dispenser in order to dispense a defined quantity of the first PMMA-based compound 6. This situation is shown in the topmost drawing of FIG. 1. The first fluid PMMA-based compound 6 has a first coloration, for example a light tooth coloration.

The upper surface of the first PMMA-based compound 6 opposite the base plate 1 can be patterned with the assistance of a stamp 7 with a previously heated patterned pressing surface 8. The pressing surface 8 may for this purpose form a surface of the stamp 7. During pressing of the first PMMA-based compound 6, the pressing surface 8 may have a temperature of between 100° C. and 140° C., wherein the temperature may preferably be adapted to the material of the first PMMA-based compound 6. An electrical resistance heater (not shown) may be arranged in the stamp 7 for heating the patterned pressing surface 8. The temperature of the patterned pressing surface 8 may preferably be adjusted. Provision may also be made for the temperature of the patterned pressing surface 8 to be measured and/or controlled with the assistance of a temperature sensor (not shown).

The heated pressing surface 8 is pressed for a number of seconds onto the still fluid first PMMA-based compound 6 and in this manner a patterned surface 10 is produced on the first PMMA-based compound 6. This situation is shown in the second drawing from the top in FIG. 1. The stamp 7 with the patterned pressing surface 8 is then detached from the patterned surface 10 of the first PMMA-based compound 6. The pattern of the patterned surface 10 of the first PMMA-based compound 6 is retained since the heat transferred by the stamp 7 causes the first PMMA-based compound 6 to solidify. This situation is shown in the third drawing from the top in FIG. 1.

The device may furthermore have a second filling means (not shown). In the same way as the first PMMA-based compound 6, a second fluid PMMA-based compound 12 can be patterned on one side using the device with the heated patterned pressing surface 8 with the assistance of the base plate 1, the boundary wall 2 and the stamp 7. The second fluid PMMA-based compound 12 has a second coloration, for example a dark tooth coloration which differs from the coloration of the first PMMA-based compound 6. The second patterned PMMA-based compound 12 can then be laid with its surface 14 patterned in this way onto the patterned surface 10 of the first patterned PMMA-based compound 6. This situation is shown in the fourth drawing from the top in FIG. 1. Instead of using the stamp 7 with the pressing surface 8, a second stamp (not shown) with a differently shaped pressing surface may also be used, such that the second PMMA-based compound 12 receives a different surface pattern than the first PMMA-based compound 6.

At least one third PMMA-based compound (not shown) patterned on two opposite sides may optionally be placed between the patterned first PMMA-based compound 6 and the patterned second PMMA-based compound 12. The two patterned surfaces of the third PMMA-based compound arranged opposite one another may for this purpose be patterned with the assistance of two heated pressing surfaces arranged opposite one another. For this purpose, the base 1 may for example be replaced by a further stamp (not shown) with a pressing surface which is of similar structure to the stamp 7 with the pressing surface 8, such as for example the stamp 27 according to FIG. 2.

The patterned first PMMA-based compound 6 and the patterned second PMMA-based compound 12 and optionally the at least one patterned third PMMA-based compound arranged therebetween may then be joined together by pressing. A press 16 which presses the PMMA-based compounds 6, 12 against one another and against the base plate 1 may be used for this purpose. This situation is shown in the bottommost drawing of FIG. 1. A force of between 1 and 10 metric tons can be applied for this purpose.

After curing, a plastics body is accordingly obtained which consists of the two cured PMMA-based compounds 6, 12 joined together via the patterned surfaces 10, 14. This plastics body can be removed from the device and used to fabricate dental prostheses with a natural appearance with the assistance of a subtractive method.

Figure 8:
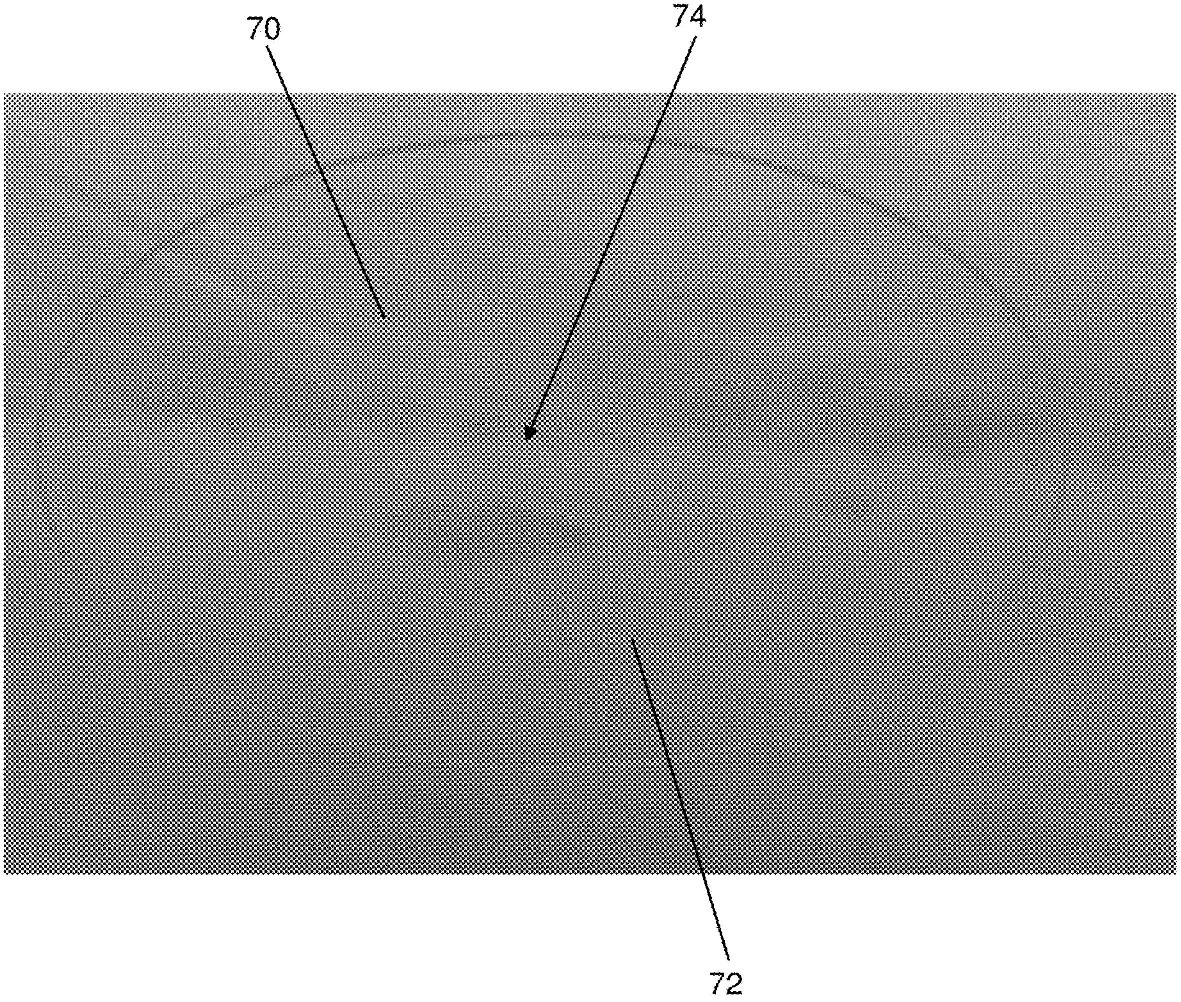
FIG. 8: shows a magnified view of a ground cross-section of a boundary surface of two PMMA-based compounds of differing coloration bonded together by short pressing with the assistance of a method according to the invention.
Figure 9:
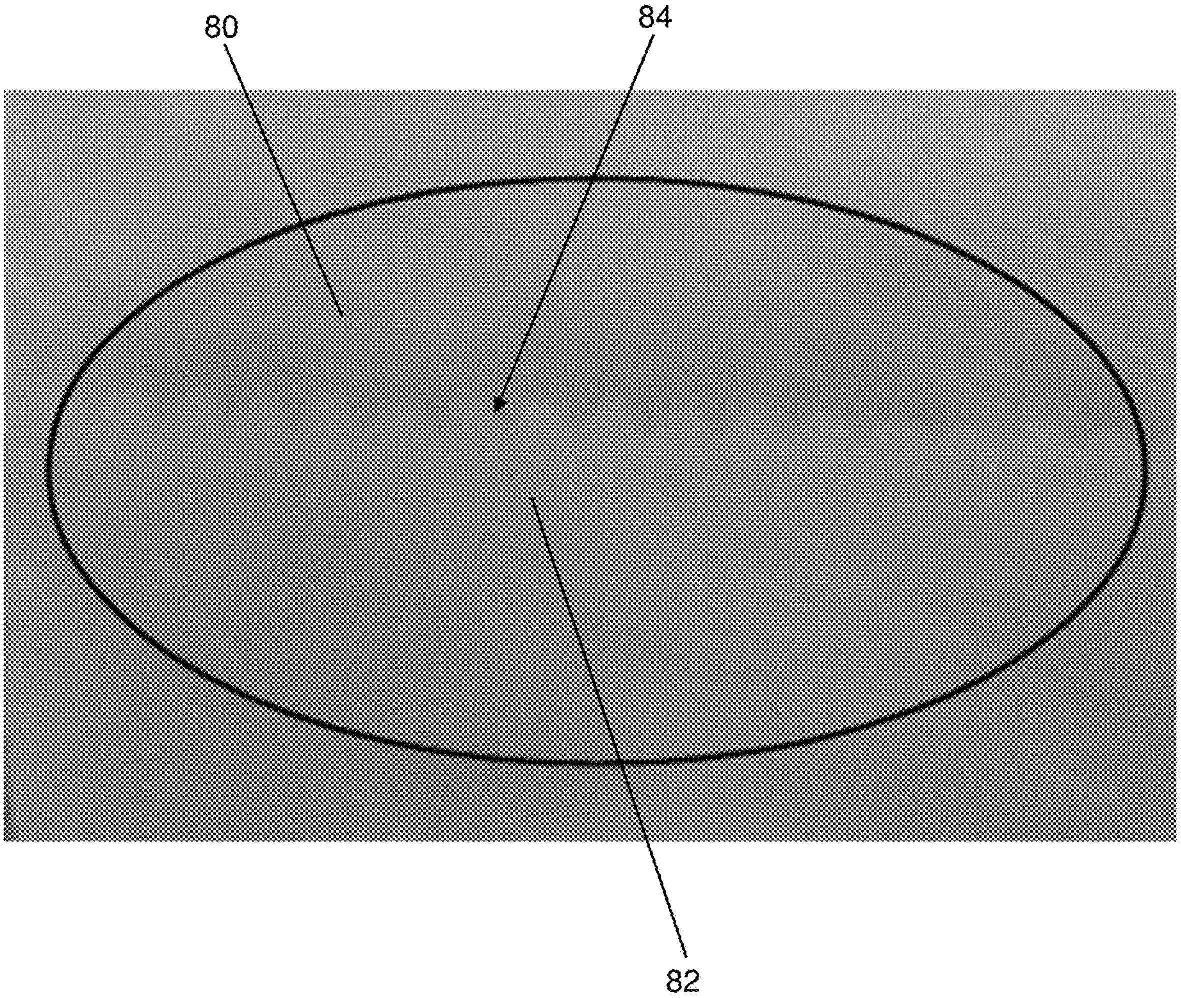
FIG. 9: shows a magnified view of a ground cross-section of a further boundary surface of two PMMA-based compounds of differing coloration bonded together by longer pressing with the assistance of a method according to the invention.

A multilayered plastics body with a plurality of intermeshed PMMA-based compounds can be produced in this way. Patterning gives rise to a natural-looking boundary surface between the PMMA-based compounds in the plastics material, as is shown in FIGS. 8 and 9.

Figure 2:
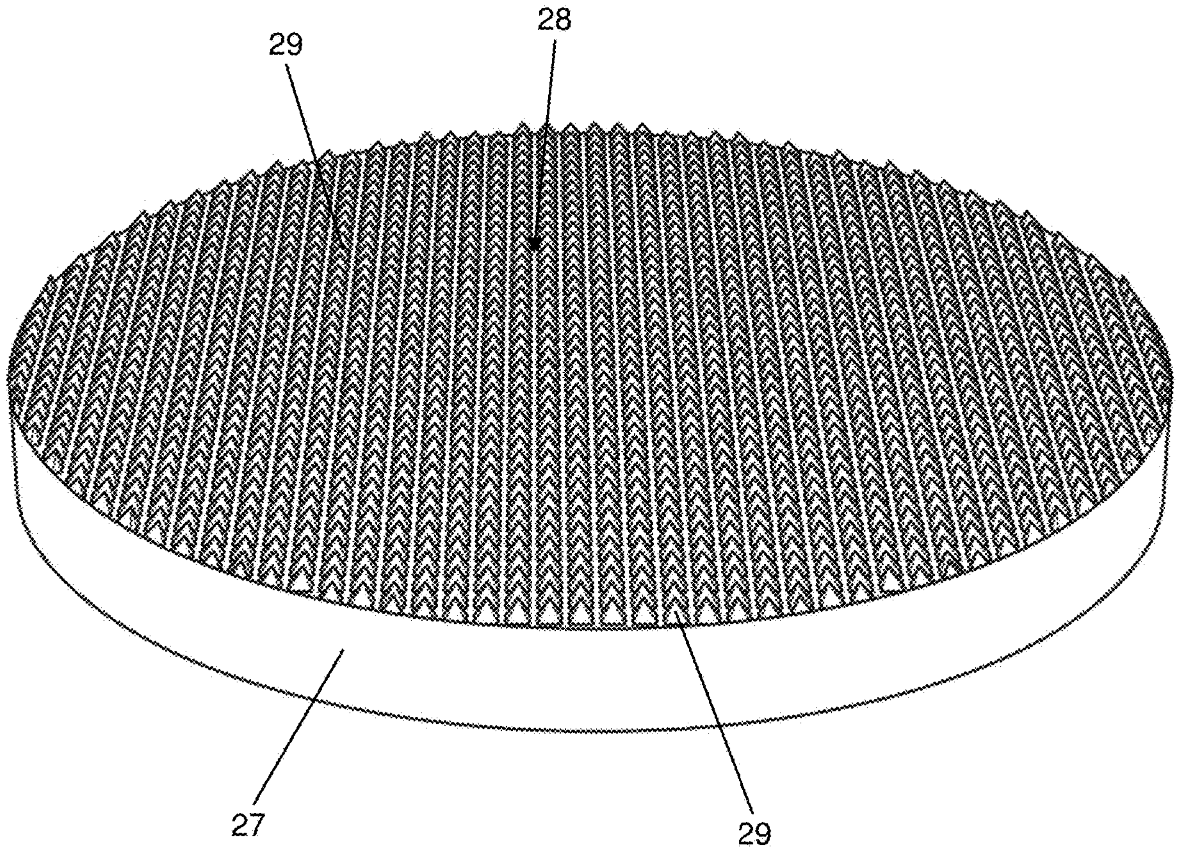
FIG. 2: shows a schematic perspective view of a second heatable patterned pressing plate for implementing a method according to the invention.
Figure 3:
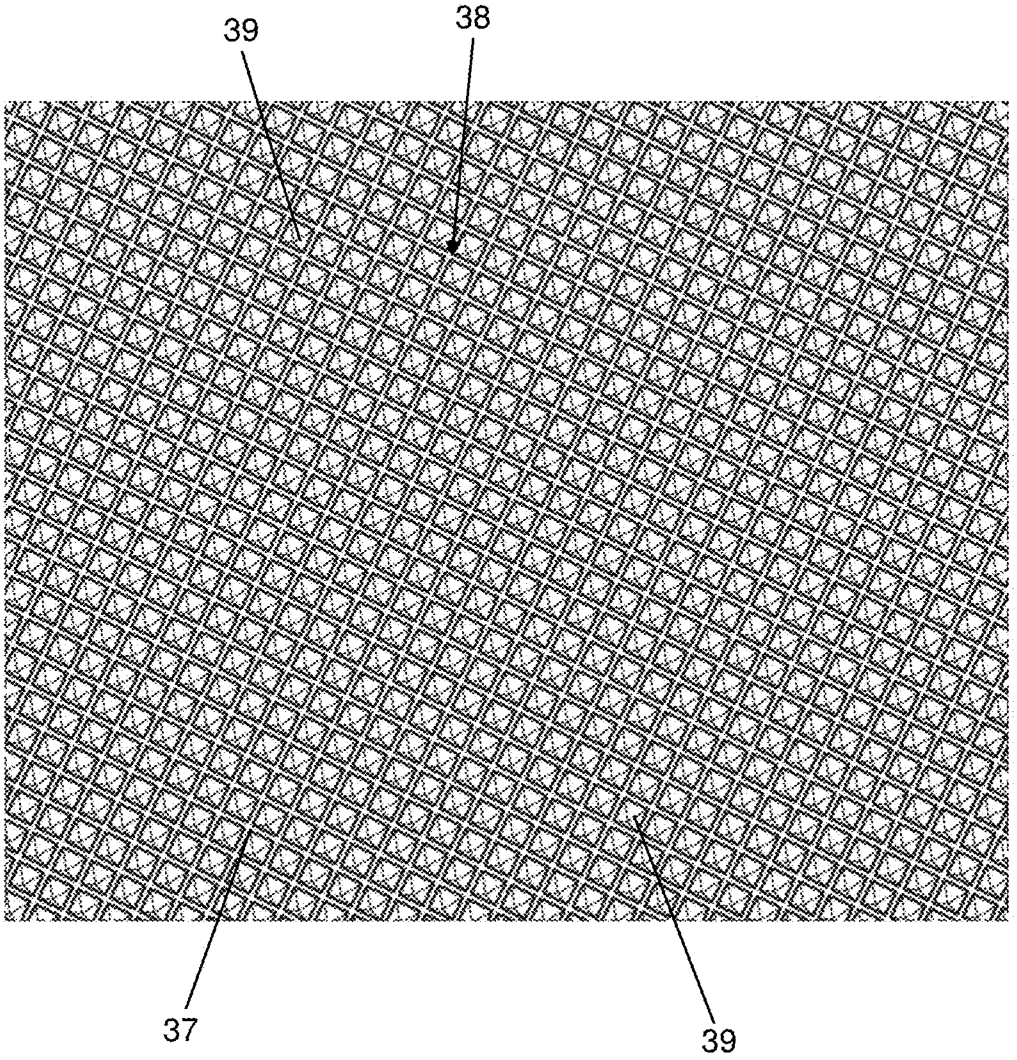
FIG. 3: shows a schematic detail view of a surface of a PMMA-based compound shaped with the second patterned pressing plate according to FIG. 2, FIG. 4: shows a schematic enlarged detail view of the patterned surface of a third heatable patterned pressing plate for implementing a method according to the invention.

FIG. 2 shows a schematic perspective view of a second heatable patterned pressing plate for implementing a method according to the invention, and FIG. 3 shows a schematic detail view of a surface of a PMMA-based compound 37 shaped with the second patterned pressing plate according to FIG. 2. The patterned pressing plate is a stamp 27. The stamp 27 may have a flat cylindrical shape. One side of the stamp 27 takes the form of a heatable patterned pressing surface 28 with which the PMMA-based compound 37 can be shaped. A plurality of four-sided pyramidal protrusions 29 may be arranged for this purpose on the patterned pressing surface 28. The pyramidal protrusions 29 are arranged as a periodic grid on the patterned pressing surface 28. The stamp 27 may consist of a metal, such as for example a stainless steel. In addition, an electrical resistance heater (not shown) with which the patterned pressing surface 28 is heatable may be arranged in the interior of the stamp 27 or externally on its opposite side to the patterned pressing surface 28. The pyramidal protrusions 29 project with their apex of between 2 mm and 3 mm from their base.

The stamp 27 may be incorporated into a heater, such that thermostatically controlled heating of the pressing plates is possible. The PMMA-based compound 37 can be patterned with this structure. The PMMA-based compound 37 then has a patterned surface 38 which is shaped as a negative of the patterned pressing surface 28. The patterned surface 38 accordingly has a plurality of periodically juxtaposed pyramidal indentations 39. A plurality of such patterned PMMA-based compounds 37 of differing coloration may be laid with their patterned surfaces 38 on one another and then press-molded together.

Figure 4:
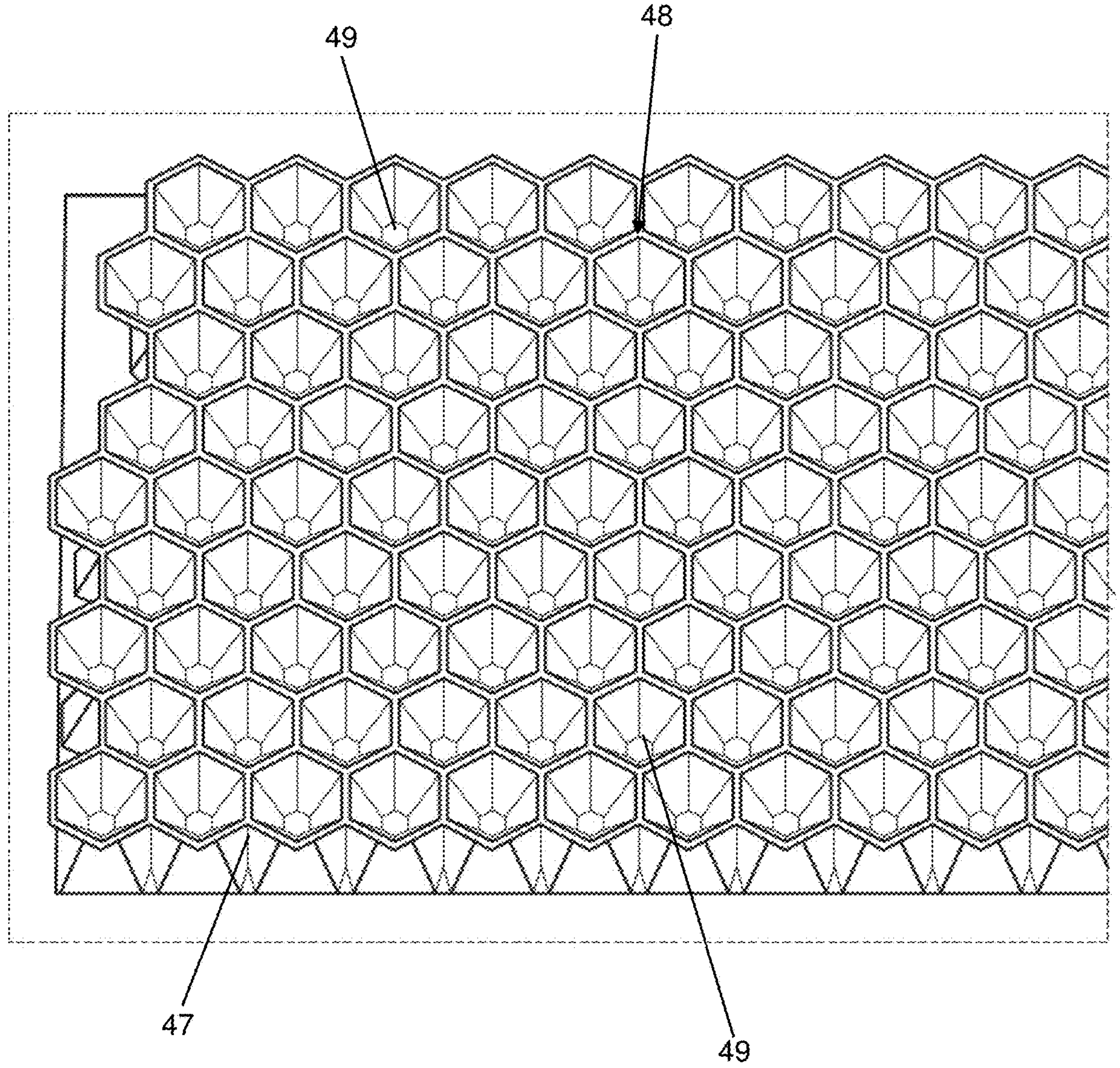
Figure 5:
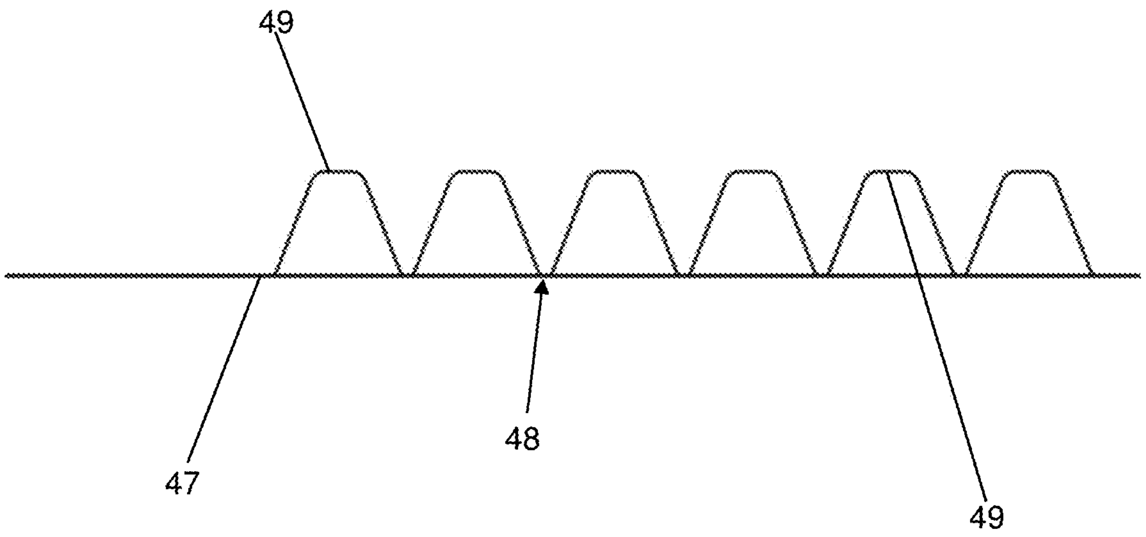
FIG. 5: shows a schematic cross-sectional view of the pattern of the third patterned pressing plate according to FIG. 4, FIG. 6: shows a schematic perspective partial view of a fourth heatable patterned pressing plate for implementing a method according to the invention.

FIG. 4 shows a schematic enlarged detail view of a patterned surface 48 of a third heatable patterned pressing plate 47 for implementing a method according to the invention and FIG. 5 shows a schematic cross-sectional view of the structure of the third patterned pressing plate 47 for this purpose. The pressing plate 47 has a honeycomb-shaped patterning in the form of honeycomb-shaped (hexagonal) indentations 49 which taper conically down to a base. A PMMA-based compound patterned therewith accordingly has a negative of the patterned surface 48 shown in FIGS. 4 and 5. The depth of the honeycomb-shaped indentations amounts to between 2° mm and 3° mm.

Figure 6:
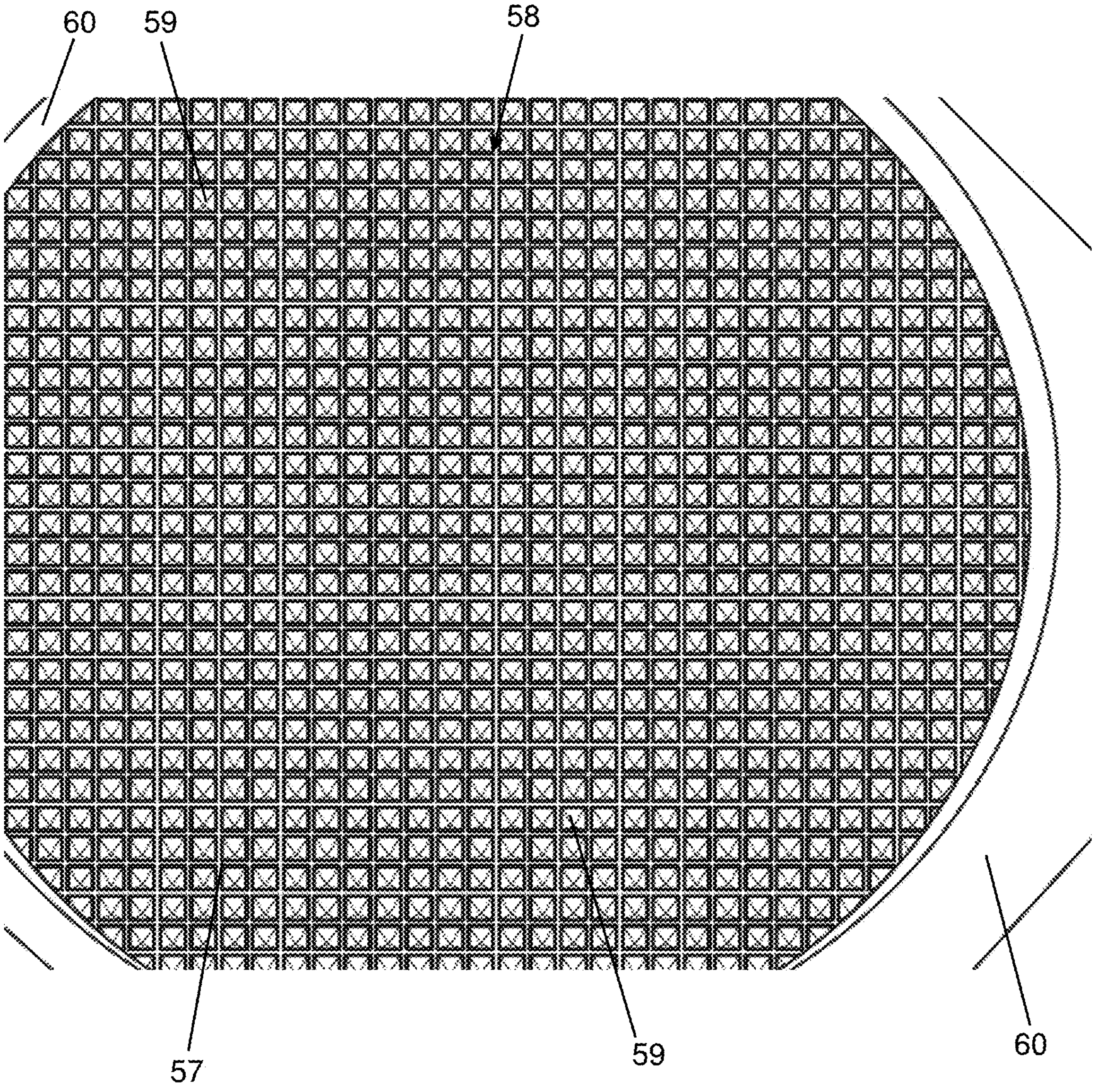

FIG. 6 shows a schematic perspective partial view of a fourth heatable patterned pressing plate 57 for implementing a method according to the invention. The patterned pressing plate is constructed like a stamp 57. One side of the patterned pressing plate 57 may take the form of a circular heatable patterned pressing surface 58 with which a PMMA-based compound can be shaped. A plurality of four-sided pyramidal indentations 59 may be arranged for this purpose in the patterned pressing surface 58. The pyramidal indentations 59 are arranged as a periodic square grid on the patterned pressing surface 58. The pyramidal indentations are between 2 mm and 3 mm deep. The patterned pressing plate 57 may have a projecting edge 60 which surrounds the patterned pressing surface 58 at the edge thereof. The patterned pressing plate 57 may consist of a thermally stable plastics material, such as for example a silicone. In addition, an electrical resistance heater (not shown) with which the patterned pressing surface 58 is heatable may be arranged in the interior of the patterned pressing plate 57 or externally on the side of the patterned pressing plate 57 opposite to the patterned pressing surface 58. Patterned pressing plates 57 are simpler and less costly to fabricate from silicone. As a material, however, silicone does not have the same fatigue strength and is thus not as suitable for manufacturing as most metals and in particular as steel. It is therefore preferred according to the invention to construct the patterned pressing surfaces from metal and in particular steel.

Figure 7:
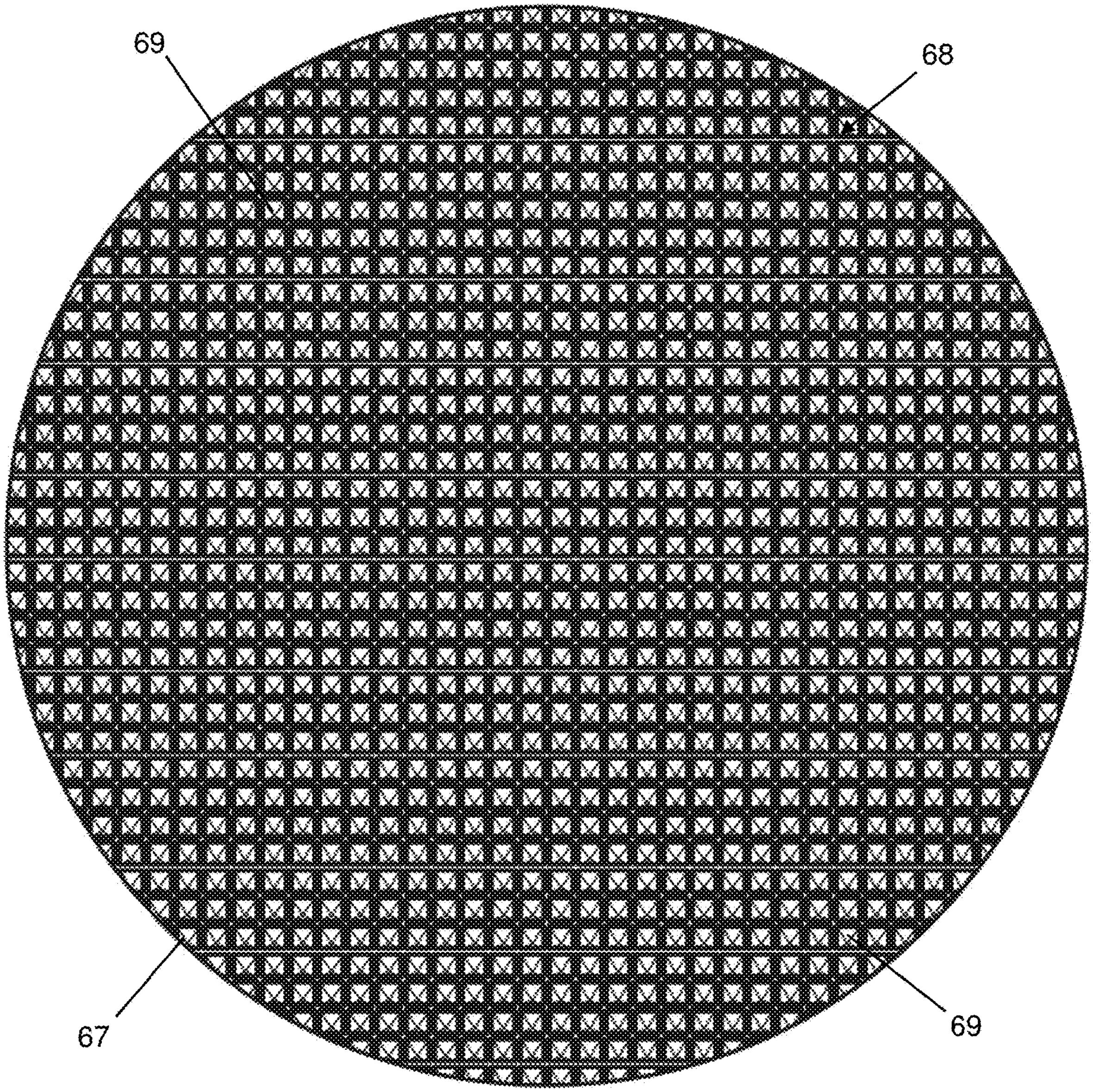
FIG. 7: shows a schematic plan view of a patterned surface of a PMMA-based compound shaped with a heated patterned pressing plate in accordance with a method according to the invention.

FIG. 7 shows a schematic plan view of a patterned surface 68 of a PMMA-based compound 67 shaped with a heated patterned pressing plate in accordance with a method according to the invention. A plurality of pyramidal indentations 69 periodically juxtaposed as a square grid rise up from the patterned surface 68. The pyramidal indentations 69 stand back with their apex between 2 mm and 3 mm from their base. A plurality of such patterned PMMA-based compounds 67 of differing coloration may be laid with their patterned surfaces 68 on one another and then press-molded together.

FIG. 8 shows a magnified view of a ground cross-section of a boundary surface of two PMMA-based compounds of differing coloration bonded together by short pressing with the assistance of a method according to the invention, and FIG. 9 shows a magnified view of a ground cross-section of a further boundary surface of two PMMA-based compounds of differing coloration bonded together by comparatively longer pressing with the assistance of a method according to the invention. The micrographs were taken with a LEICA DMS 1000 microscope at four- to six-times magnification.

The multilayer composite was produced by impressing standard dental material (Flexecure Dentin Zahnmaterial from Kulzer GmbH) as the first PMMA-based compound with a temperature of 115° C. for a duration of between 20 s and 70 s at a pressure with a pressing force of approx. 100 kg onto an area of 450 $cm^2$. Pressing was carried out with a patterned pressing surface 38, as is shown in part in FIG. 4.

Subsequent to impressing, the patterned PMMA-based compounds were assembled, press-molded and polymerized.

Figure 10:
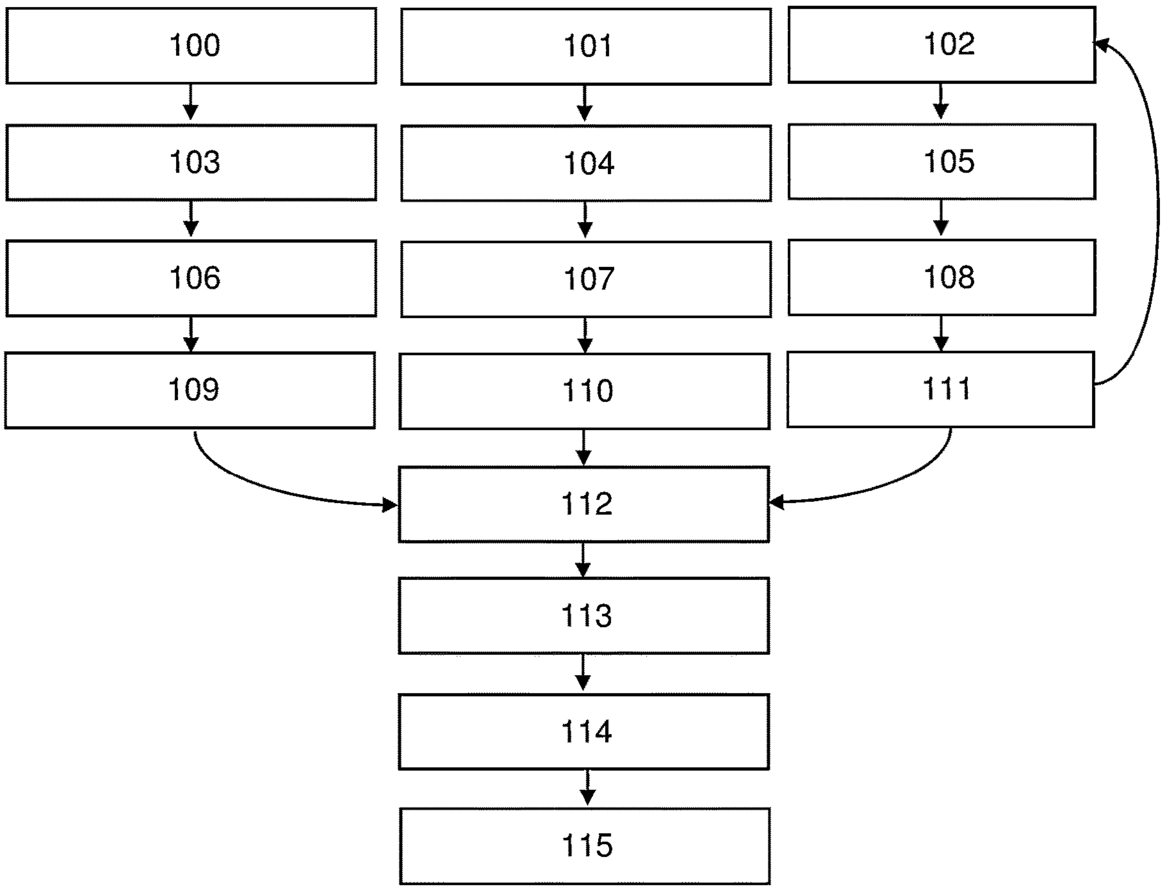
FIG. 10: shows the sequence of a method according to the invention for producing a plastics body with patterned layers for producing dental prostheses as a sequence diagram.

An exemplary method is explained below with reference to the device according to the invention described with FIG. 1. The sequence of the exemplary method is shown in the sequence diagram according to FIG. 10. The description is, however, also straightforwardly transferable to other exemplary embodiments.

A first fluid PMMA-based compound 6 with a first coloration may be provided in a processing step 100. In parallel, a second fluid PMMA-based compound 12 with a second coloration may be provided in a processing step 101 and at least one third fluid PMMA-based compound with a third coloration may optionally be provided in a processing step 102.

The first fluid PMMA-based compound 6 may be applied onto a surface, such as for example onto the surface of the base plate 1, in a processing step 103 following processing step 100. Similarly, the second fluid PMMA-based compound 12 may be applied onto a surface, such as for example onto the surface of the base plate 1, in a processing step 104 following processing step 101. Similarly, the at least one third fluid PMMA-based compound may be introduced between two patterned heated pressing surfaces in a processing step 105 following the optional processing step 102.

A surface 10 of the first PMMA-based compound 6 can be patterned with the heated pressing surface 8 in a processing step 106 following processing step 103. In the same manner, a surface 14 of the second PMMA-based compound 12 can be patterned with the heated pressing surface 8 or another pressing surface in a processing step 107 following processing step 104, and two opposing surfaces of the at least one third PMMA-based compound may optionally be patterned with the two patterned heated pressing surfaces in a processing step 108 following processing step 105.

Subsequently, pressing surface 8 can be detached from the first PMMA-based compound 6 in a processing step 109 following processing step 106. Likewise, pressing surface 8 or the other pressing surface can be detached from the second PMMA-based compound 12 in a processing step 110 following processing step 107. In the optional branch of the method, the two pressing surfaces can be detached from the at least one third PMMA-based compound in an optional processing step 111 following optional processing step 108.

After these processing steps, the patterned second PMMA-based compound 12 can be arranged on the patterned first PMMA-based compound 6 in a processing step 112, such that the two patterned surfaces 10, 14 of the patterned first PMMA-based compound 6 and of the patterned second PMMA-based compound 12 are oriented toward one another. Alternatively, at least one patterned third PMMA-based compound can be arranged between the patterned first PMMA-based compound 6 and the patterned second PMMA-based compound 12, such that the two patterned surfaces 10, 14 of the patterned first PMMA-based compound 6 and of the patterned second PMMA-based compound 12 are oriented toward one another.

All the PMMA-based compounds 6, 12 arranged on one another are then compression molded together and the PMMA-based compounds 6, 12 cured in a processing step 113.

The resultant cured and layered plastics body may be removed in a processing step 114.

Subsequently, in an optional processing step 115, at least one dental prosthesis may be milled from the cured layered plastics body with the assistance of a subtractive method, such as for example with a CAM milling machine.

The features of the invention disclosed in the above description, as well as in the claims, figures, and exemplary embodiments, may be essential both individually and in any desired combination to realizing the invention in its various embodiments.

LIST OF REFERENCE SIGNS

1 Base plate
2 Boundary wall
3 Filling means
4 Pipe
5 Container
6 PMMA-based compound
7 Stamp
8 Patterned pressing surface
9 Stamp
10 Patterned surface
12 Second PMMA-based compound
14 Patterned surface
16 Press
27 Stamp
28 Patterned pressing surface
29 Pyramidal protrusions
37 Patterned PMMA-based compound
38 Patterned surface
39 Pyramidal indentation
47 Pressing plate
48 Patterned pressing surface
49 Honeycomb-shaped indentation
57 Pressing plate
58 Patterned pressing surface
59 Pyramidal indentation
60 Edge
67 Patterned PMMA-based compound
68 Patterned surface
69 Pyramidal indentation
70 First PMMA-based compound
72 Second PMMA-based compound
74 Boundary surface
80 First PMMA-based compound
82 Second PMMA-based compound
84 Boundary surface
100 Processing step: provision of a first fluid PMMA-based compound with a first coloration
101 Processing step: provision of a second fluid PMMA-based compound with a second coloration
102 Optional processing step: provision of at least one third fluid PMMA-based compound with a third coloration
103 Processing step: application of the first fluid PMMA-based compound onto a surface
104 Processing step: application of the second fluid PMMA-based compound onto a surface
105 Optional processing step: introduction of the at least one third fluid PMMA-based compound between two patterned heated pressing surfaces
106 Processing step: patterning of a surface of the first PMMA-based compound with a heated pressing surface

107 Processing step: patterning of a surface of the second PMMA-based compound with a heated pressing surface

108 Optional processing step: patterning of two opposing surfaces of the at least one third PMMA-based compound with the two patterned heated pressing surfaces

109 Processing step: detachment of the pressing surface from the first PMMA-based compound

110 Processing step: detachment of the pressing surface from the second PMMA-based compound

111 Optional processing step: detachment of the two pressing surfaces from the at least one third PMMA-based compound

112 Processing step: arrangement of the patterned second PMMA-based compound on the patterned first PMMA-based compound, such that the two patterned surfaces of the patterned first and second PMMA-based compounds are oriented toward one another, or arrangement of the at least one patterned third PMMA-based compound between the patterned first PMMA-based compound and the patterned second PMMA-based compound, such that the two patterned surfaces of the patterned first and second PMMA-based compounds are oriented toward one another

113 Processing step: compression molding of all the PMMA-based compounds arranged on one another and curing of the PMMA-based compounds

114 Processing step: removal of the cured layered plastics body

115 Optional processing step: fabrication of at least one dental prosthesis from the cured layered plastics body

The invention claimed is:

1. A method for producing a plastics body with patterned layers for producing dental prostheses, wherein the method comprises the following steps:

A) providing a first PMMA-based compound and a second PMMA-based compound, wherein the first PMMA-based compound is uncured and has a first coloration and wherein the second PMMA-based compound is uncured and has a second coloration, wherein the second coloration of the second PMMA-based compound differs from the first coloration of the first PMMA-based compound;

B) heating a first patterned pressing surface to a temperature of between 90° C. and 150° C.;

C) pressing the first PMMA-based compound with the heated first patterned pressing surface, wherein a patterned surface of the first PMMA-based compound is obtained in this manner;

D) subsequently detaching the first pressing surface from the patterned first PMMA-based compound, wherein the patterned surface of the first PMMA-based compound is retained; and E) heating the first patterned pressing surface to a temperature of between 90° C. and 150° C. or heating of a second patterned pressing surface to a temperature of between 90° C. and 150° C.;

F) pressing the second PMMA-based compound with the heated first patterned pressing surface or the heated second patterned pressing surface, wherein a patterned surface of the second PMMA-based compound is obtained in this manner;

G) subsequently detaching the first pressing surface or the second pressing surface from the patterned second PMMA-based compound, wherein the patterned surface of the second PMMA-based compound is retained;

H) subsequently laying the patterned second PMMA-based compound on the patterned first PMMA-based compound, such that the patterned surface of the second PMMA-based compound is oriented toward the patterned surface of the first PMMA-based compound;

I) subsequently compression molding the first patterned PMMA-based compound with the second patterned PMMA-based compound, such that a solid bond is created between the first PMMA-based compound and the second PMMA-based compound, and J) curing the patterned first PMMA-based compound and the second PMMA-based compound compression molded therewith;

the method further comprising:

pressing an uncured third PMMA-based compound proceeds with two heated patterned pressing surfaces arranged opposite one another, wherein a patterned surface is consequently obtained on both sides of the third PMMA-based compound, wherein the third PMMA-based compound has a third coloration which differs from the first coloration of the first PMMA-based compound and from the second coloration of the second PMMA-based compound, subsequently detaching the pressing surfaces from the third PMMA-based compound patterned on both sides, wherein the two patterned surfaces of the third PMMA-based compound are retained, wherein in step H) the patterned third PMMA-based compound is arranged between the patterned second PMMA-based compound and the patterned first PMMA-based compound, such that the patterned surfaces lie against one another, and wherein in step I) subsequent compression molding of the first patterned PMMA-based compound with the second patterned PMMA-based compound and with the third patterned PMMA-based compound arranged therebetween proceeds such that a solid bond is created between the first PMMA-based compound, the second PMMA-based compound and the third PMMA-based compound; or in step H) overall a plurality of further PMMA-based compounds are arranged between the first patterned PMMA-based compound and the patterned second PMMA-based compound, wherein the colorations of adjacent PMMA-based compounds of the first, second, and plurality of PMMA-based compounds differ from one another, wherein before step H) each of the plurality of further PMMA-based compounds is patterned with two heated patterned pressing surfaces arranged opposite one another, wherein a patterned surface is consequently obtained on both sides of the plurality of further PMMA-based compounds, and the pressing surfaces are subsequently detached from the plurality of further PMMA-based compounds patterned on both sides, wherein the two patterned surfaces of the plurality of further PMMA-based compounds are retained, and in step I) subsequent compression molding of the first patterned PMMA-based compound with the second patterned PMMA-based compound and with the plurality of further patterned PMMA-based compounds arranged therebetween proceeds such that a solid bond is created between the first PMMA-based compound, the second PMMA-based compound and the plurality of further PMMA-based compounds arranged therebetween.

2. The method according to claim 1, wherein pressing of the first PMMA-based compound in step C) with the heated first patterned pressing surface and pressing of the second PMMA-based compound in step F) with the first patterned pressing surface or with the second heated patterned pressing surface proceeds with a pressure of between 10 $KN/m^2$ and 500 $KN/m^2$.

3. The method according to claim 1, wherein pressing of the third PMMA-based compound or of the further PMMA-based compounds with the two heated patterned pressing surfaces arranged opposite one another proceeds with a pressure of between 10 $KN/m^2$ and 500 $kN/m^2$.

4. The method according to claim 1, wherein pressing of the first PMMA-based compound in step C) with the heated first patterned pressing surface and pressing of the second PMMA-based compound in step G) with the heated first patterned pressing surface or with the heated second patterned pressing surface proceeds for a period of between 1 s and 50 s.

5. The method according to claim 1, wherein the first patterned pressing surface and/or the second patterned pressing surface is or are heated during pressing.

6. The method according to claim 1, wherein the first patterned pressing surface and/or the second patterned pressing surface have patterns with a profile height of between 1 mm and 5 mm.

7. The method according to claim 1, wherein a pressure of between 10 $kN/m^2$ and 500 $kN/m^2$ is applied for the compression molding in step I).

8. The method according to claim 7, wherein the projecting peaks or the projecting pyramidal or conical protrusions are arranged periodically in the pressing surface.

9. The method according to claim 1, wherein the first patterned pressing surface and/or the second patterned pressing surface have a honeycomb pattern or a plurality of peaks projecting from the pressing surface or a plurality of pyramidal or conical protrusions projecting from the pressing surface.

10. The method according to claim 1, wherein the first patterned pressing surface and/or the second patterned pressing surface consist of silicone or are coated with silicone or consist of a metal.

11. The method according to claim 1, wherein the PMMA-based compounds have a viscosity of between 1 Pa·s and 1000 Pa·s at their time of use and at a temperature of 20° C.

12. The method according to claim 1, wherein step J) proceeds after step I).

13. The method according to claim 1 wherein the colorations of adjacent PMMA-based compounds of the first, second, and plurality of PMMA-based compounds differ from one another.

14. The method according to claim 1, wherein pressing of the first PMMA-based compound in step C) with the heated first patterned pressing surface and pressing of the second PMMA-based compound in step F) with the first patterned pressing surface or with the second heated patterned pressing surface proceeds with a pressure of between between 10 $kN/m^2$ and 100 $kN/m^2$.

15. The method according to claim 1, wherein pressing of the third PMMA-based compound or of the further PMMA-based compounds with the two heated patterned pressing surfaces arranged opposite one another proceeds with a pressure of between 10 $kN/m^2$ and 100 $kN/m^2$.

16. The method according to claim 1, wherein pressing of the first PMMA-based compound in step C) with the heated first patterned pressing surface and pressing of the second PMMA-based compound in step G) with the heated first patterned pressing surface or with the heated second patterned pressing surface proceeds for a period of between 1 s and 30 s, wherein if present, pressing of the third PMMA-based compound or of a plurality of further PMMA-based compounds with the two heated patterned pressing surfaces arranged opposite one another proceeds for a period of between 1 s and 30 s.

17. The method according to claim 1, wherein all the patterned pressing surfaces used are heated during pressing.

18. The method according to claim 1, wherein the first patterned pressing surface and/or the second patterned pressing surface have patterns with a profile height of between 2 mm and 3 mm.

19. The method according to claim 1, wherein a pressure of between 10 $kN/m^2$ and 50 $kN/m^2$ is applied for the compression molding in step I).

20. The method according to claim 1, wherein the first patterned pressing surface and/or the second patterned pressing surface consist of silicone or consist of a metal or steel coated with silicone.

21. The method according to claim 1, wherein the first patterned pressing surface and/or the second patterned pressing surface consist of a metal or steel coated with polytetrafluoroethylene.

22. A method for producing dental prostheses, wherein the method comprises a method according to claim 1 and the method additionally comprises the following step:

K) carving out of a dental prosthesis or a plurality of individual dental prostheses from the completely cured plastics body after method steps A) to I) and optionally J), wherein a tooth axis of the dental prosthesis or tooth axes of the plurality of individual dental prostheses extends or extend from a basal end of the dental prosthesis or dental prostheses, wherein the dental prosthesis or the dental prostheses are subtractively carved out from the plastics body in such a manner that the tooth axis or the tooth axes extends or extend through a plurality of layers of the PMMA-based compounds of the plastics body.

23. The method according to claim 22, wherein in step K) carving out proceeds with the assistance of a subtractive CAM process.

* * * * *